(12) United States Patent
Falana et al.

(10) Patent No.: US 7,169,739 B2
(45) Date of Patent: Jan. 30, 2007

(54) METHODS OF REDUCING SAG IN NON-AQUEOUS FLUIDS

(75) Inventors: Olusegun M. Falana, Bartlesville, OK (US); Bharat B. Patel, Bartlesville, OK (US); Wayne S. Stewart, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 293 days.

(21) Appl. No.: 10/764,667

(22) Filed: Jan. 26, 2004

(65) Prior Publication Data

US 2005/0164891 A1 Jul. 28, 2005

(51) Int. Cl.
*E21B 33/00* (2006.01)

(52) U.S. Cl. ...................... 507/209; 507/203

(58) Field of Classification Search ............ 507/203, 507/209
See application file for complete search history.

(56) References Cited

U.S. PATENT DOCUMENTS

| | | | | |
|---|---|---|---|---|
| 2,437,046 | A * | 3/1948 | Rothrock, Jr. et al. | 528/287 |
| 2,689,219 | A * | 9/1954 | Menaul | 507/116 |
| 3,112,338 | A * | 11/1963 | Smutny et al. | 560/72 |
| 4,188,236 | A * | 2/1980 | Robertson et al. | 106/491 |
| 4,259,225 | A * | 3/1981 | Saito et al. | 523/351 |
| 4,458,757 | A * | 7/1984 | Bock et al. | 166/267 |
| 4,619,957 | A * | 10/1986 | Reid et al. | 524/91 |
| 4,690,996 | A * | 9/1987 | Shih et al. | 527/312 |
| 5,366,961 | A | 11/1994 | Harrington | 514/53 |
| 6,159,906 | A | 12/2000 | McNally et al. | 507/119 |
| 6,204,224 | B1 | 3/2001 | Quintero et al. | |
| 6,339,048 | B1 | 1/2002 | Santhanam et al. | 507/131 |
| 6,770,601 | B1 * | 8/2004 | Brookey | 507/102 |
| 2005/0087341 | A1 * | 4/2005 | McCabe et al. | 166/278 |

FOREIGN PATENT DOCUMENTS

| EP | 1 111 024 A1 | 6/2001 |
|---|---|---|
| WO | WO 2004/113467 A1 | 12/2004 |

OTHER PUBLICATIONS

International Search Report and Written Opinion, PCT/US2005/000225, Jun. 16, 2005, 12 pgs.
Connors, et al., "N-Methylimidazole as a catalyst in Hydroxy Compounds Esterification," *Herba Polonica*, 1998, pp. 33-38.
D'Accorso, et al., "Mass Spectra of Some Per-O-benzoyl-alditols and -aldobiitols," *John Wiley & Sons, Ltd.*, 1991, pp. 799-803.
"D-Sorbit," Internal Search Report by Chevron Phillips, pp. 1-66.

* cited by examiner

*Primary Examiner*—Kuo-Liang Peng
(74) *Attorney, Agent, or Firm*—Conley Rose, P.C.; Rodney B. Carroll; Kimberly L. Brown

(57) ABSTRACT

Methods of reducing sag include combining a cystol ester compound with a non-aqueous fluid and particles to reduce sag in the resulting fluid composition without significantly increasing the viscosity of the fluid composition. The fluid composition CONTAINS the non-aqueous fluid, the particles, and the cystol ester compound. Suitable cystol ester compounds include cystol ester and derivatives of cystol ester having mono-, di-, or tri-substituted aromatic compounds as substituents. The non-aqueous fluid may CONTAINS an invert emulsion, diesel oil, mineral oil, an olefin, an organic ester, a synthetic fluid, or combinations thereof. Further, the fluid composition may be used as a wellbore servicing fluid such as a drilling fluid. The particles may CONTAINS a weighting agent, e.g., barite, galena, hematite, dolomite, calcite, or combinations thereof. The fluid composition may also include organophilic clay.

31 Claims, No Drawings

METHODS OF REDUCING SAG IN NON-AQUEOUS FLUIDS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to particle-containing fluids, and more particularly to methods of reducing sag in non-aqueous fluids, e.g., invert emulsions, containing particles by combining cystol ester and/or at least one of its derivatives with the fluids.

BACKGROUND OF THE INVENTION

Subterranean deposits of natural resources such as gas, water, and crude oil are commonly recovered by drilling wellbores to tap subterranean formations or zones containing such deposits. A drilling fluid or mud is usually circulated through a wellbore as it is being drilled to cool the bit, keep the deposits confined to their respective formations during the drilling process, and return drill cuttings, i.e., small pieces of shale and/or rock generated by the drill bit, back to the surface. Drilling through subterranean zones containing clay and shale that swell upon exposure to water requires the use of non-aqueous drilling fluids to avoid problems such as sloughing and well collapse. Such non-aqueous fluids include a base fluid such as diesel oil, mineral oil, an olefin, an organic ester, or a synthetic fluid. The drilling fluid is commonly an invert emulsion, i.e., a water-in-oil emulsion.

Solid particles are often added to non-aqueous drilling fluids for various reasons. For example, weighting agents such as barite particles may be added to the drilling fluid to increase the density of the fluid and thus ensure that the fluid provides high hydrostatic pressures in the wellbore. Unfortunately, the solid particles, particularly the relatively heavy particles of a weighting agent, may settle and/or stratify in the fluid as it is being pumped through the wellbore. As a result of such settling, a problem known as sag can occur in which the specific gravity of the drilling fluid along the fluid column varies.

Traditionally, materials such as organophilic clays have been added to drilling fluids to overcome the sag problem. However, those materials undesirably increase the viscosity of the drilling fluid and thus cause the drilling efficiency to decrease. As a result of the increase in viscosity, relatively high pump pressures may be required to convey the fluid into and out of the wellbore. Further, it may be difficult to remove drill cuttings from the wellbore, resulting in the fluid having an excessive circulation density and thus leading to the loss of its circulation in the wellbore. A need therefore exists to develop a method of reducing the sag in a non-aqueous fluid such as a drilling fluid without significantly increasing the viscosity of the fluid.

SUMMARY OF THE INVENTION

According to an embodiment, methods of reducing sag include combining a cystol ester compound with a non-aqueous fluid and particles to reduce sag in the resulting fluid composition. The fluid composition may be used as a wellbore servicing fluid such as a drilling fluid. In one embodiment, the non-aqueous fluid comprises an invert emulsion and the particles comprise a barite-weighting agent. In an embodiment, the reduction in sag that is achieved in this case is in the range of from about 0% to about 100%. Further, the introduction of the cystol ester compound to the fluid composition does not significantly increase the viscosity of the fluid composition. In an embodiment, the apparent viscosity change of the fluid composition is less than about 50% after heating for 4 hours at 160° F. Fluid compositions may be made using the foregoing methods.

In an embodiment, fluid compositions include a non-aqueous fluid, particles, and a cystol ester compound for reducing sag therein. The non-aqueous fluid comprises an invert emulsion, diesel oil, mineral oil, an olefin, an organic ester or a synthetic fluid, or combinations thereof. Suitable cystol ester compounds include cystol ester and derivatives of cystol ester having mono-, di-, or tri-substituted aromatic compounds as substituents. In addition, the particles comprise a weighting agent, e.g., barite, galena, hematite, dolomite, calcite, or combinations thereof. The fluid compositions may also include organophilic clay.

DETAILED DESCRIPTION OF THE PREFERRED EMBODIMENTS

In accordance with an embodiment, a fluid composition includes a non-aqueous fluid, particles, and a cystol ester compound for reducing sag in the fluid composition. As used herein, "sag" is defined as: an increase in specific gravity of a fluid due to the settling and/or the stratification of particles under dynamic and/or static condition; or as defined in the field, a variation in specific gravity of a fluid along a column of the fluid as a result of the settling of particles in the fluid. Further, as used herein, "cystol ester compound" refers to cystol ester or derivatives of cystol ester, e.g., cystol ester having mono-, di-, or tri-substituted aromatic moieties. Cystol esters are also commonly termed cystosol esters and may be reffered to herein as such. The cystol ester compound is a non-polymeric material that can be utilized in the fluid composition to reduce sag without significantly increasing the viscosity of the fluid composition. In an embodiment, the fluid composition may serve as a wellbore servicing fluid. As used herein, "wellbore servicing fluid" refers to a fluid that may be used to prepare a wellbore or a subterranean formation penetrated by the wellbore for the recovery of material from the formation. It is understood that "subterranean formation" encompasses both areas below exposed earth or areas below earth covered by water such as sea or ocean water.

The fluid composition contains a balance of the non-aqueous fluid after taking other components of the fluid composition into account. The bulk of the non-aqueous fluid primarily comprises a liquid that is not water and thus contains only a relatively small amount of water (typically from about 5% to about 40% by weight of the non-aqueous fluid) or is substantially free of water. The non-aqueous fluid may, for example, comprise an invert emulsion, diesel oil, mineral oil, an olefin, an organic ester, a synthetic fluid, or combinations thereof. In an embodiment, the fluid composition is an invert emulsion drilling fluid comprising water droplets dispersed in an oil phase. The water droplets may comprise fresh water or salt water such as a brine or seawater. An example of a suitable brine is a $CaCl_2$ brine.

The type of particles contained in the fluid composition may vary depending on the particular use of the fluid composition and of the particles. By way of example, the particles may be used to improve or alter the properties of a fluid composition to be used as a wellbore servicing fluid. For instance, the particles may be used to control fluid loss, reduce torque and drag, increase the viscosity of the fluid composition, and/or increase the density of the fluid composition. In addition, drill solid particles may be incorporated in the fluid composition during drilling operations. In an embodiment, the fluid composition may serve as a drilling fluid, a work over fluid, a completion fluid, a drill-in fluid, or a kill fluid, and the particles may comprise at least one weighting agent having a relatively high specific gravity for increasing the density of the fluid composition. Examples of suitable weighting agents include barite, galena, hematite, dolomite, calcite, iron oxide, illmenite, siderite, celestite, and combinations thereof. Other types of particles that may be used in other types of fluid compositions may include, but are not limited to, asphalt, polymers, graphite, gilsonite, water-soluble polymers, personal care solutes, salts, and paint and ink particles. An amount of the weighting agent in the drilling fluid may range from about 0 weight percent (wt. %) to about 80 wt. %, from about 0 wt. % to about 70 wt. %, or from about 0 wt. % to about 60 wt. %, all weight percentages being based on the total weight of the fluid composition.

Cystol ester compounds suitable for use in the fluid composition can be generally represented by the following formula:

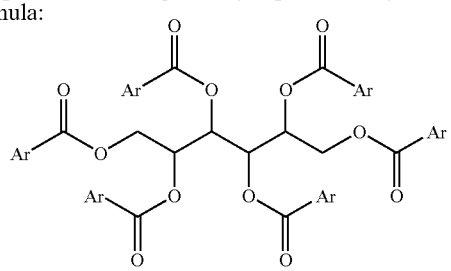

wherein Ar is generally represented by the following formula:

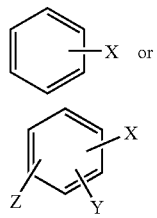

wherein in formula I, X=hydrogen, an alkyl group, an alkoxyl group, a nitro group, a halide group, a cyano group, an amino group, or an aryl group, and wherein in formula II, X=Y=Z=an alkoxy or an alkyl group; X=Y or Z with X, Y, and Z being selected from the group consisting of hydrogen, an alkyl group, an alkoxyl group, a nitro group, a halide group, a cyano group, an amino group, and an aryl group; X=Y≠Z with X, Y, and Z being selected from the group consisting of hydrogen, an alkyl group, an alkoxyl group, a nitro group, a halide group, a cyano group, an amino group, and an aryl group; or X≠Y≠Z with X, Y, and Z being selected from the group consisting of hydrogen, an alkyl group, an alkoxyl group, a nitro group, a halide group, a cyano group, an amino group, and an aryl group. Examples of suitable cystol ester compounds include cystol ester, hexa-O-benzoyl cystol (X is H); hexa-O-para-toluoyl cystol (X is $CH_3$), hexa-O-meta-toluoyl cystol (X is $CH_3$), hexa-O-ortho-toluoyl cystol (X is $CH_3$), hexa-O-para-tert-butylbenzoyl cystol (X is $C(CH_3)_3$), hexa-O-para-pentylbenzoyl cystol (X is pentyl), hexa-O-para-heptylbenzoyl cystol (X is heptyl), hexa-O-para-chlorobenzoyl cystol (X is Cl), hexa-O-para-cyanobenzoyl cystol, (X is CN), hexa-O-para-nitrobenzoyl cystol (X is $NO_2$), hexa-O-3,4,5-trimethoxybenzoyl cystol (X=Y=Z=$OCH_3$), and combinations thereof. In an embodiment, the cystol ester compound is hexa-O-para-toluoyl cystol.

Such cystol ester compounds are soluble in the non-aqueous fluid, e.g., the continuous phase of an invert emulsion. The cystol ester compounds may be prepared as described in Tauro et al., 100 *Bolletino Chimico Farmacentico*, p. 723–731 (1961); and Connors et al., 44(1) *Herba Polonica*, p. 33–38 (1998), each of which is incorporated by reference herein in its entirety. Other suitable methods of making cystol ester compounds are provided in the examples below. The amount of cystol ester compound present in the fluid composition is effective to suspend the particles in the fluid composition both when the fluid composition is stationary and when it is being forced into movement by, for example, agitation or circulation such as pumping. In the case where the fluid composition is an invert emulsion drilling fluid and the particles are a weighting agent, the amount of the cystol ester compound present in the fluid composition may range from about 0.05% to about 5%, from about 0.1% to about 4%, or from about 0.2% to about 3%, all by total weight of the fluid composition.

The fluid composition may include additional additives as deemed appropriate by one skilled in the art. Such additives may vary depending on the intended use of the fluid composition in the wellbore. For example, when the fluid composition is to be used as a drilling fluid, it may optionally include organophilic clay, i.e., chemically modified clay, such as bentonite, hectorite or attapulgite. An example of commercially available organophilic clay is the VG-69 clay sold by M-I L.L.C. of Houston, Tex. It is believed that the use of organophilic clay in combination with the previously described cystol ester compound improves the sag of the drilling fluid even more than using the cystol ester compound without the organophilic clay. However, the organophilic clay may cause the viscosity of the fluid composition to increase significantly whereas using the cystol ester compound alone most likely would not do this. An amount of the organophilic clay present in the drilling fluid may range from about 0% to about 5%, from about 0.25% to about 4.5%, or from about 0.5% to about 4%, all by weight of the total weight of fluid composition. Examples of other additives that the fluid composition may contain include emulsifiers, fluid loss control agents, oxidation and corrosion inhibitors, bacteriacides, thinners, and so forth.

The foregoing fluid composition may be prepared by combining the non-aqueous fluid, the particles, and the cystol ester compound in any order. The fluid composition can be prepared beforehand and stored until its use is desired. Alternatively, the fluid composition can be formed onsite, e.g., near a wellbore, by adding the cystol ester compound to a mixture of a non-aqueous fluid and particles when a sag problem is observed or detected. If desired, the cystol ester compound and the non-aqueous fluid/particles mixture may be combined immediately prior to pumping the resulting fluid composition into the wellbore. In an embodiment, a drilling fluid is prepared by blending a cystol ester compound with an invert emulsion and a weighting agent using a standard mixing device to cause the cystol ester compound to become substantially dissolved in the continuous phase of the drilling fluid. Suitable methods of preparing the fluid composition are also provided in the examples below.

In an embodiment, the fluid composition containing the non-aqueous fluid, the particles, and the cystol ester compound can be displaced into a wellbore and used to service the wellbore in accordance with procedures known to one skilled in the art. For example, when the intended use of the fluid composition is as a drilling fluid, it can be circulated down through a hollow drill stem and out through a drill bit attached thereto while rotating the drill stem to thereby drill the wellbore. The drilling fluid also can be flowed back to the surface such that it deposits a filter cake on the wall of the wellbore and carries drill cuttings to the surface.

The presence of the cystol ester compound in the fluid reduces sag such that the specific gravity throughout a column of the fluid becomes more uniform. Otherwise, the particles in the fluid composition would be prone to settle under static or dynamic conditions. This reduction in sag occurs over a wide range of temperatures and shear rates, wherein "shear rate" refers to the velocity gradient measured across the diameter of a fluid flow channel. By way of example, the reduction in sag achieved by the cystol ester compound in a fluid composition comprising an invert emulsion and barite is in the range of from about 0% to about 100%, from about 50% to 100%, or from about 75% to 100%. In this case, the amount by which the sag is reduced is calculated using the following equations:

$$\% \text{ Reduction in Sag} = \{1-[(\% \text{ sag in cystol ester treated fluid})/(\% \text{ sag in untreated base fluid})]\} 100\%. \quad \text{(Equation 1)}$$

The % reduction in sag may be determined using the following procedure: (1) while mixing with a Multimixer, prepare two samples of a non-aqueous fluid composition in separate containers (for each sample, mix 140 g mineral oil, 5 g lime, 3.5 g VG-69 clay, 5 g VERSAMUL emulsifier package, 0.8 g VERSACOAT emulsifier, 55 g $CaCl_2$ brine having a density of 10 lbs/gal, and 212 g barite); (2) measure the initial specific gravity (SG-I) of each sample at about 80° F.; (3) mix 4 grams of a cystol ester compound discussed herein in one of the samples; (4) close the containers and then roll them for about four hours in an oven maintained at about 160° F.; (5) after cooling the samples, mix them for 10 minutes on the Multimixer; (6) test the samples for Apparent Viscosity (AV), Plastic Viscosity (PV), Yield Point (YP), and Gel Strength (Gels) according to the "Recommended Practice Standard Procedure for Field Testing Oil-Based Drilling Fluids," API Recommended Practice 13B-2 (RP 13B-2) published by American Petroleum Institute; (7) transfer each sample into an aging cell (the cell is made from 316SS, is cylindrical in shape, and has an inside diameter of about 2.9 inches and an inside height of about 4.7 inches) and after closing each cell, roll the cells for about 16 hours in an oven maintained at 250° F.; (8) keep the hot cells in vertical position for about two hours at about 75° F.; (9) open the cells and gently pour back a portion of each of the fluid samples into the original container and measure the specific gravity (SG) of about 40 mL of the fluid composition from the bottom of the cells; (10) calculate % sag as follows:

$$\% \text{ Sag} = [(SG/SG\text{-}I) - 1.00]*100\% \quad \text{(Equation 2); and}$$

(11) calculate % reduction in sag using Equation 1 above.

Using the cystol ester compound to reduce sag in a fluid composition builds relatively little or no viscosity in the fluid composition. The viscosity of the fluid composition also remains sufficient to suspend particles therein when the fluid composition is immobile and when it is flowing.

Further, the viscosity is sufficient to suspend drill cuttings in the fluid composition as the fluid composition flows from down in the wellbore back to the drilling platform. For example, the apparent viscosity of the fluid composition changes by less than about 50%, alternatively less than about 20%, or about 5% after combining the cystol ester compound with the fluid composition comprising an invert emulsion and barite, as measured after heating the fluid composition for 4 hours at 160° F. As such, the fluid composition containing the cystol ester compound is shear thinning, allowing the fluid composition to be pumped to a desired location.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

In the following examples 4 and 5, the flow properties (AV, PV, YP, and Gels) of the drilling fluid samples were tested using a Viscosity-Gel (VG) meter (Model 35) in accordance with the previously mentioned API 13B-2.

Example 1

A sample of hexa-O-para-toluoyl cystol was prepared in accordance with the following procedure. First, 15 g (82.4 mmol) of cystol was added to 84 mL of pyridine, which served as a catalyst as well as the solvent, and stirred to form a suspension. While continuously stirring the suspension, 45.20 mL (494 mmol) of p-toluoyl chloride was added drop-wisely to the suspension for a period of 15 minutes. The resultant light yellow solution was refluxed at 90° C. for 1 hour. The reaction was then quenched with ground ice chips (50 g), and the reaction product was washed twice with 200 mL of an aqueous solution containing 44 wt.% hydrochloric acid (HCl) per total weight of the solution, and then twice with 200 mL of distilled water to remove the pyridine. The cystol ester compound was then extracted from the reaction product by contacting it with 200 mL of dichloromethane, followed by evaporation of the dichloromethane and drying of the resultant cystol ester compound under vacuum. The hexa-O-para-toluoyl cystol, which is represented by the following formula, appeared to be a light orange solid:

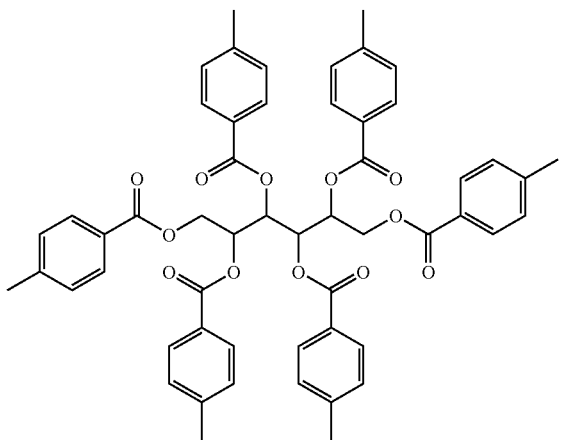

Example 2

A sample of hexa-O-benzoyl cystol was prepared in accordance with the procedure described in Example 1 except that the amount of pridine used was 100 mL and the p-toluoyl chloride was replayed with 58 ml of benzoyl chloride. The hexa-O-benzoyl cystol is represented by the following formula:

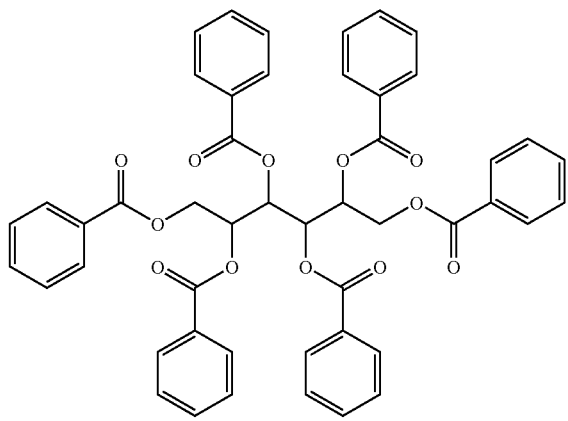

Example 3

A sample of hexa-O-para-tert-butylbenzoyl cystol was prepared in accordance with the procedure described in Example 1 except that the amount of pyridine used was 100 mL and the p-toluoyl chloride was replaced with 90 mL of p-t-benzoyl chloride. The hexa-O-para-tert-butylbenzoyl cystol is represented by the following formula:

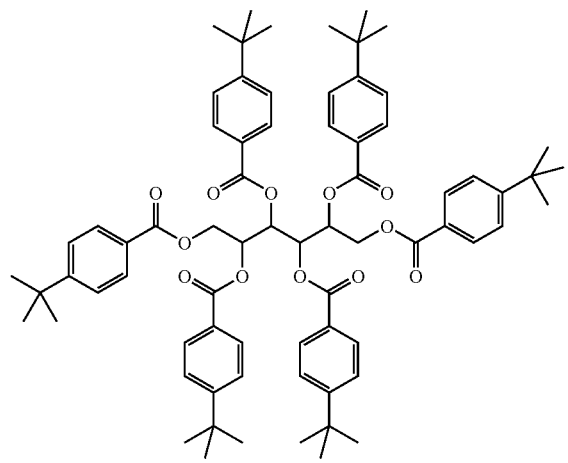

Example 4

This example illustrates that using cystol ester compounds in an invert emulsion containing barite reduces sag. In this example, an invert emulsion drilling fluid (IEDF) containing the following materials was prepared: 1,980 grams of ESCAID 110 mineral oil commercially available from Exxon Mobile, Inc.; 70 grams of lime, 49 grams of VG-69 organophilic clay commercially available from M-I L.L.C.; 70 grams of VERSAMUL emulsifier package for oil-based drilling fluids, also commercially available from M-I L.L.C.; 11.67 grams of VERSACOAT emulsifier for oil-based drilling fluids, also commercially available from M-I L.L.C.; 760 grams of $CaCl_2$ brine having a density of 10 lbs/gal; and 175 grams of rev dust for simulating drill cuttings, the rev dust being an altered Ca-montmorillonite, Al-silicate with low quartz content and low alkaline earth metal content. After transferring the mineral oil into a bucket and then stirring the oil sample with a laboratory dispersator, the materials were added about five minutes apart into the oil sample according to the order they are listed. The IEDF was mixed for 20 minutes using a high-shear mixing device, in particular a ROSS mixer (Model ME-100 L) sold by Charles Ross & Son Company of Hauppauge, N.Y. The IEDF was then divided into three samples containing 208 grams each of the IEDF, and the samples were placed in three separate pint jars. Next, the Multimixer was employed to blend three drilling fluid samples containing the materials shown in Table 1 below. After the addition of each material, the sample was blended for the period of time shown in Table 1. Then the three pint jars were capped, rolled in an oven at 160° F. for four hours, cooled, and mixed 10 minutes on the Multimixer. As shown in Table 2 below, the initial specific gravity (SG-I) and various flow properties (AV, PV, YP, and Gels) of each sample were measured at 80° F.

TABLE 1

| Sample No. | Materials Mixed |
|---|---|
| 1 (control) | 208 grams of IEDF + 212 grams of barite (10 minutes) |
| 2 | 208 grams of IEDF + 212 grams of barite (10 minutes) + 2.8 grams of hexa-O-para-toluoyl cystol (10 minutes) |
| 3 | 208 grams of IEDF + 212 grams of barite (10 minutes) + 4.0 grams of hexa-O-benzoyl cystol (10 minutes) |

TABLE 2

| Sample No. | Initial Specific Gravity (SG-I) | $600^1$ | $300^1$ | Apparent Viscosity, cp | Plastic Viscosity, cp | Yield Point lbs/100 $ft.^2$ | Gel Strength (10 s/10 min), lbs/100 $ft.^2$ |
|---|---|---|---|---|---|---|---|
| 1 (control) | 1.52 | 46 | 24 | 23.0 | 22 | 2 | 4/16 |

TABLE 2-continued

| Sample No. | Initial Specific Gravity (SG-I) | 600[1] | 300[1] | Apparent Viscosity, cp | Plastic Viscosity, cp | Yield Point lbs/100 ft.[2] | Gel Strength (10 s/10 min), lbs/100 ft.[2] |
|---|---|---|---|---|---|---|---|
| 2 | 1.52 | 45 | 23 | 22.5 | 22 | 1 | 3/12 |
| 3 | 1.52 | NT[2] | NT[2] | NT[2] | NT[2] | NT[2] | NT[2] |

[1]600 and 300 represent dial readings at 600 RPM and 300 RPM on the VG meter, respectively
[2]13 NT = Not tested due to insoluble particles Next, the samples were transferred into the aging cells. After closing the cells, they were rolled about 16 hours in an oven at 250° F., and then the hot cells were kept in vertical position for about two hours at about 75° F. After opening the cells, a portion of the fluid sample from each aging cell was gently poured back into the original pint jar. Exactly 42.1 mL of the fluid sample from the bottom of each aging cell was transferred into a pre-calibrated beaker and weighed. The specific gravity, the % sag, and the % sag reduction were calculated in accordance with the following equations:

Specific Gravity=Weight/42.1

% Sag=[(Specific Gravity/$SG$-$I$ in Table 2)–1.0]100%

% Sag Reduction=[1–(% sag of cystol ester treated sample/% sag of sample 1)]100%

These test results are provided in Table 3 below under "Sag Test at 250° F."

TABLE 3

| | Sag Test at 250° F. | | | |
|---|---|---|---|---|
| Sample No. | Weight, g | Specific Gravity | Sag, % | Sag Reduction, % |
| 1 | 103.22 | 2.45 | 61.18 | — |
| 2 | 65.51 | 1.56 | 2.63 | 95.70 |
| 3 | 65.30 | 1.55 | 1.97 | 96.78 |

Each fluid sample was subsequently mixed 10 minutes on the Multimixer and tested on the VG meter at 80° F., 120° F., and 150° F. The results of these tests are shown in Table 4 below.

As determined in Table 2, the specific gravity of all three samples should be 1.52 (when the specific gravity at the top and the bottom of the fluid is the same) if no sag problem occurred. As shown in Table 3, the specific gravity of control sample 1 was thus much higher than 1.52, resulting in 61.18% sag. Samples 2 and 3 exhibited only 2.63% and 1.97% sag, respectively. Thus, compared tp sample 1, the % sag was reduced by 95.7% in sample 2 by mixing hexa-O-para-toluoyl cystol with the IEDF and the barite. Similarly, the % sag was reduced by 96.78% in sample 3 by mixing hexa-O-benzoyl cystol and the barite.

Based on the results shown in Table 2 and Table 4, the flow properties of all three IEDF samples were about the same. Generally, a reduction in sag is expected to result from an increase in flow properties such as apparent viscosity, plastic viscosity, yield point, and gel strength. However, the use of the cystol ester compounds to reduce sag advantageously did not adversely affect the flow properties of the IEDF.

Example 5

This example further illustrates that using cystol ester compounds in an invert emulsion containing barite reduces sag. In this example, an invert emulsion drilling fluid (IEDF) containing 1,980 grams of ESCAID 110 mineral oil, 70 grams of lime, 35 grams of VG-69 organophilic clay, 70 grams of VERSAMUL emulsifier package, 11.67 grams of VERSACOAT emulsifier, 760 grams of CaCl$_2$ brine having a density of 10 lbs/gal, and 175 grams of rev dust for simulating drill cuttings was prepared as described in Example 4. The IEDF was mixed for 20 minutes using the ROSS mixer (Model ME-100 L). The IEDF was then

TABLE 4

| Sample No. | Temp., ° F. | 600[1] | 300[1] | Apparent Viscosity, Cp | Plastic Viscosity, cp | Yield Point lbs/100 ft.[2] | Gel Strength (10 s/10 min), lbs/100 ft.[2] |
|---|---|---|---|---|---|---|---|
| 1 | 80 | 45 | 24 | 22.5 | 21 | –3 | 3/18 |
| 1 | 120 | 33 | 17 | 16.5 | 16 | –1 | 2/15 |
| 1 | 150 | 28 | 14 | 14.0 | 14 | 0 | 2/11 |
| 2 | 80 | 46 | 25 | 23.0 | 21 | 4 | 4/13 |
| 2 | 120 | 37 | 20 | 18.5 | 17 | 3 | 4/10 |
| 2 | 150 | 30 | 16 | 15.0 | 14 | 2 | 5/9 |
| 3 | 80 | 51 | 25 | 25.5 | 26 | –1 | 7/22 |
| 3 | 120 | 38 | 19 | 19.0 | 19 | 0 | 7/19 |
| 3 | 150 | 32 | 16 | 16.0 | 16 | 0 | 5/17 |

[1]600 and 300 represent dial readings at 600 RPM and 300 RPM on the VG meter, respectively divided into three samples containing 208 grams each of the IEDF, and the samples were placed in three separate pint jars. Next, the Multimixer was employed to blend three drilling fluid samples containing the materials shown in Table 5 below. After the addition of each material, the sample was blended for the period of time shown in Table 5. Then the three pint jars were capped, rolled in an oven at 160° F. for 3.5 hours, allowed to cool, and mixed 10 minutes on the Multimixer. As shown in Table 6 below, the initial specific gravity (SG-I) and various flow properties (AV, PV, YP, and Gels) of each sample were measured at 120° F.

TABLE 5

| Sample No. | Materials Mixed |
| --- | --- |
| 4 (control) | 208 grams of IEDF + 212 grams of barite (10 minutes) |
| 5 | 208 grams of IEDF + 212 grams of barite (10 minutes) + 1.6 grams of hexa-O-para-toluoyl cystol (10 minutes) |
| 6 | 208 grams of IEDF + 212 grams of barite (10 minutes) + 1.6 grams of hexa-O-para-tert-butylbenzoyl cystol (10 minutes) |

TABLE 6

| Sample No. | Initial Specific Gravity (SG-I) | $600^1$ | $300^1$ | Apparent Viscosity, Cp | Plastic Viscosity, cp | Yield Point lbs/100 ft.$^2$ | Gel Strength (10 s/10 min), lbs/100 ft.$^2$ |
| --- | --- | --- | --- | --- | --- | --- | --- |
| 4 | 1.52 | 28 | 14 | 14 | 14 | 0 | 5/7 |
| 5 | 1.52 | 28 | 14.5 | 14 | 13.5 | 1 | 4/7 |
| 6 | 1.52 | 29 | 15 | 14.5 | 14 | 1 | 6/9 |

$^1$600 and 300 represent dial readings at 600 RPM and 300 RPM on the VG meter, respectively Next, the samples were transferred into the aging cells (316 SS). After closing the cells, they were rolled about 16 hours in an oven at 175° F., and then the hot cells were kept in vertical position for 2 hours in the oven at about 175° F. After cooling the cells to about 80° F., a portion of the fluid sample from each aging cell was gently poured back into the original pint jar. Exactly 42.1 mL of the fluid sample from the bottom of each aging cell was transferred into the pre-calibrated beaker and weighed. These test results are provided in Table 7 below under "Sag Test at 175° F." Then, the fluid samples were mixed 10 minutes on the Multimixer and transferred back to their respective aging cells. After closing the cells, they were rolled 2.5 hours in an oven at about 215° F., and then the hot cells were kept in vertical position for 2 hours in the oven at about 225° F. After cooling them to about 80° F., a portion of the fluid sample from each aging cell was gently poured back into the original pint jar. Exactly 42.1 mL of the fluid sample from the bottom of each aging cell was transferred into the pre-calibrated beaker and weighed. These test results are provided in Table 7 under "Sag Test at 225° F." The same equations as those used in Example 4 were employed to determine the specific gravity, % sag, and % sag reduction, as shown in Table 7 below.

TABLE 7

| | Sag Test at 175° F. | | | | Sag Test at 225° F. | | | |
| --- | --- | --- | --- | --- | --- | --- | --- | --- |
| Sample No. | Weight, g | Specific Gravity | Sag, % | Sag Reduction, % | Weight, g | Specific Gravity | Sag, % | Sag Reduction, % |
| 4 | 88.39 | 2.10 | 38.16 | — | 102.57 | 2.44 | 60.52 | — |
| 5 | 72.36 | 1.72 | 13.16 | 65.51 | 86.19 | 2.05 | 34.87 | 42.38 |
| 6 | 87.32 | 2.07 | 36.18 | 5.19 | 94.12 | 2.24 | 47.37 | 21.73 |

Each fluid sample was subsequently mixed 10 minutes on the Multimixer and tested on the VG meter at 120° F. and 150° F. The results of these tests are provided in Table 8 below. Each fluid sample was again mixed 10 minutes on the Multimixer and transferred into a heating cup. While stirring at 600 rpm on the VG meter, the sample was heated to 150° F. As soon as the tempture of the sample reached 149° F., the stirring speed was reduced to 100 rmp and a timer was turned on. After stirring for 30 minutes at 100 rpm and about 150° F., a portion of the hot fluid sample from the heating cup was gently poured back into the original pint jar. Exactly 12.35 mL of the fluid sample from the bottom of each aging cell was transferred into a pre-calibrated beaker and weighed. The same equations as those used in Example 4 were employed to determine the specific gravity, % sag, and % sag reduction, as shown in Table 9 below.

TABLE 8

| Sample No. | Temp (° F.) | $600^1$ | $300^1$ | Apparent Viscosity (cp) | Plastic Viscosity (cp) | Yield Point (lbs/100 ft.$^2$) | Gel Strength 10 s/10 min (lbs/100 ft.$^2$) |
| --- | --- | --- | --- | --- | --- | --- | --- |
| 4 | 120 | 31 | 15.5 | 15.5 | 15.5 | 0 | 3/13 |
| 4 | 150 | 25 | 13 | 12.5 | 12.0 | 1 | 3/11 |
| 5 | 120 | 32 | 16.5 | 16.0 | 15.5 | 1 | 4/10 |
| 5 | 150 | 28 | 14 | 14.0 | 14.0 | 0 | 5/8 |
| 6 | 120 | 33 | 17 | 16.5 | 16.0 | 1 | 6/18 |
| 6 | 150 | 27 | 14 | 13.5 | 13.0 | 1 | 5/18 |

$^1$600 and 300 represent dial readings at 600 RPM and 300 RPM on the VG meter, respectively

TABLE 9

| Sample No. | Weight (g) | Specific Gravity | Sag (%) | Sag Reduction (%) |
|---|---|---|---|---|
| 4 | 26.12 | 2.115 | 39.14 | — |
| 5 | 23.20 | 1.879 | 23.62 | 39.65 |
| 6 | 24.07 | 1.949 | 28.22 | 27.90 |

It was determined that the specific gravity of all three samples should be 1.52 (when the specific gravity at the top and the bottom of the fluid is the same) if no sag problem occurred. As shown in Table 7, the specific gravity of control sample 4 was 2.10 and 2.44 when the sag test was preformed at 175° F. and 225° F., resoectively. The specific gravity of control sample 4 was thus much higher than 1.52, resulting in the highest % sag. Sample 5 exhibited the lowest specific gravity values, resulting in the lowest % sag. Compared to sample 4, the %sag was reduced by more than 40% in sample 5 by mixing hexa-O-para-toluoyl cystol with the IEDF and the barite. While hexa-O-para-tert-butylbenzoyl cystol reduced sag by about 22% at elevated temperature (225° F.), still, it was less effective than hex-O-para-toluoyl cystol with recored % sag of about 42%. Of import, however, is the fact the the efficiency of the former increased at elvated temperature (225° F.) by about 15% from about 5% at 175° F. contrary to our expectation.

Based on the results shown in Table 6 and Table 8, the flow properties of all three IEDF samples were about the same. Generally, a reduction in sag is expected to result from an increase in flow properties such as apparent viscosity, plastic viscosity, yield point, and gel strenght. However, the use of the cystol ester compounds to reduce sag advantageously did not adversely affect the flow properties of the IEDF.

The results in Table 9 show that, in a dynamic sag test, the specific gravity for control sample 4 was higher that of the other samples (i.e., 2.115). Again sample 5 had the lowest specific gravity (i.e., 1.879) and thus the least amount of sag. Sample 6, which had a specific gravity of 1.949, exhibited less sag than control sample 4. Consequently, the use of the cystol ester compounds in the IEDF reduced sag both while the IEDF was static and while it was being stirred.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method for reducing sag in a fluid composition, comprising: combining a cystosol ester compound with a non-aqueous fluid and particles to reduce sag in the resulting fluid composition, wherein the particles comprise barite, galena, hematite, dolomite, calcite, or combinations thereof wherein the cystosol ester compound is represented by the following formula:

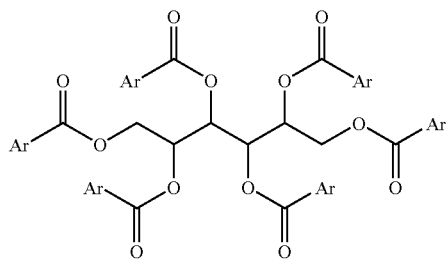

wherein Ar is represented by the following formula:

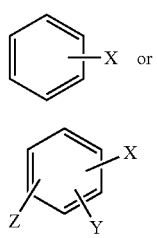

wherein in formula I, X=hydrogen, an alkyl group, an alkoxyl group, a nitro group, a halide group, a cyano group, an amino group, or an aryl group, and wherein in formula II, X=Y=Z=an alkoxy or an alkyl group; X=Y or Z with X, Y and Z being selected from the group consisting of hydrogen, an alkyl group, an alkoxyl group, a nitro group, a halide group, a cyano group, an amino group, and an aryl group; X=Y≠Z with X, Y, and Z being selected from the group consisting of hydrogen, an alkyl group, an alkoxyl group, a nitro group, a halide group, a cyano group, an amino group, and an aryl group; or X≠Y≠Z with X, Y, and Z being selected from the group consisting of hydrogen, an alkyl group, an alkoxy group, a nitro group, a halide group, a cyano group, an amino group, and aryl group.

2. The method of claim 1, wherein the non-aqueous fluid comprises an invert emulsion, diesel oil, mineral oil, an olefin, an organic ester, a synthetic fluid, or combinations thereof.

3. The method of claim 1, wherein the fluid composition comprises a drilling fluid, a work over fluid, a completion fluid, a drill-in fluid, or a kill fluid.

4. The method of claim 1, wherein the cystosol ester compound comprises hexa-O-benzoyl cystosol, hexa-O-para-toluoyl cystosol, hexa-O-meta-toluoyl cystosol, hexa-O-ortho-toluoyl cystosol, hexa-O-para-tert-butylbenzoyl cystosol, hexa-O-para-pentylbenzoyl cystosol, hexa-O-para-heptylbenzoyl cystosol, hexa-O-para-chlorobenzoyl cystosol, hexa-O-para-cyanobenzoyl cystosol, hexa-O-para-nitrobenzoyl cystosol, hexa-O-3,4,5-trimethoxybenzoyl cystosol, or combinations thereof.

5. The method of claim 1, wherein the cystosol ester compound comprises hexa-O-para-toluoyl cystosol.

6. The method of claim 1, wherein the particles comprise a weighting agent.

7. The method of claim 1, wherein an amount of the cystosol ester compound present in the non-aqueous fluid is in a range of from about 0.05% to about 5% by total weight of the final fluid composition.

8. The method of claim 1, wherein an amount of the cystosol ester compound present in the non-aqueous fluid is in a range of from about 0.1% to about 4% by total weight of the final fluid composition.

9. The method of claim 1, wherein an amount of the cystosol ester compound present in the non-aqueous fluid is in a range of from about 0.2% to about 3% by total weight of the final fluid composition.

10. The method of claim 1, wherein the non-aqueous fluid comprises organophilic clay.

11. The method of claim 1, wherein the non-aqueous fluid comprises an invert-emulsion and the particles comprise barite.

12. The method of claim 11, wherein a reduction in the sag is in a range of from about 5% to about 100%.

13. The method of claim 11, wherein a reduction in the sag is in a range of from about 10% to about 100%.

14. The method of claim 11, wherein a reduction in the sag is in a range of from about 15% to about 100%.

15. The method of claim 11, wherein an apparent viscosity of the fluid composition changes by less than about 50% when the cystosol ester compound is added.

16. The method of claim 11, wherein an apparent viscosity of the fluid composition changes by less than about 20% when the cystosol ester compound is added.

17. The method of claim 11, wherein an apparent viscosity of the fluid composition changes by about 5% when the cystosol ester compound is added.

18. A fluid composition comprising: a non-aqueous fluid, particles, and a cystosol ester compound for reducing sag in the fluid composition, wherein the particles comprise barite, galena, hematite, dolomite, calcite, or combinations thereof wherein the cystosol ester compound is represented by the following formula:

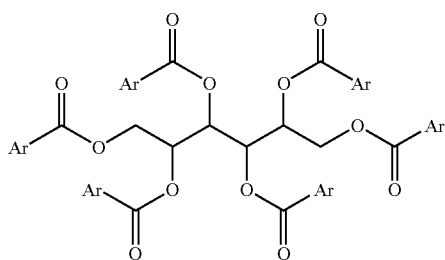

wherein Ar is represented by the following formula:

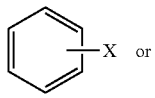

I.

-continued

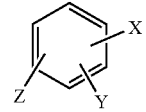

II.

wherein in formula I, X=hydrogen, an alkyl group, an alkoxyl group, a nitro group, a halide group, a cyano group, an amino group, or an aryl group, and wherein in formula II, X=Y=Z=an alkoxy or an alkyl group; X=Y or Z with X, Y and Z being selected from the group consisting of hydrogen, an alkyl group, an alkoxyl group, a nitro group, a halide group, a cyano group, an amino group, and an aryl group; X=Y≠Z with X, Y, and Z being selected from the group consisting of hydrogen, an alkyl group, an alkoxyl group, a nitro group, a halide group, a cyano group, an amino group, and an aryl group; or X≠Y≠Z with X, Y, and Z being selected from the group consisting of hydrogen, an alkyl group, an alkoxy group, a nitro group, a halide group, a cyano group, an amino group, and aryl group.

19. The fluid composition of claim 18, wherein the non-aqueous fluid comprises an invert emulsion, diesel oil, mineral oil, an olefin, an organic ester, a synthetic fluid, or combinations thereof.

20. The fluid composition of claim 18, wherein the fluid composition comprises a drilling fluid, a work over fluid, a completion fluid, a drill-in fluid, or a kill fluid.

21. The fluid composition of claim 18, wherein the cystosol ester compound comprises hexa-O-benzoyl cystosol, hexa-O-para-toluoyl cystosol, hexa-O-meta-toluoyl cystosol, hexa-O-ortho-toluoyl cystosol, hexa-O-para-tert-butylbenzoyl cystosol, hexa-O-para-pentylbenzoyl cystosol, hexa-O-para-heptylbenzoyl cystosol, hexa-O-para-chlorobenzoyl cystosol, hexa-O-para-cyanobenzoyl cystosol, hexa-O-para-nitrobenzoyl cystosol, hexa-O-3,4,5-trimethoxybenzoyl cystosol, or combinations thereof.

22. The fluid composition of claim 18, wherein the cystosol ester compound comprises hexa-O-para-toluoyl cystosol.

23. The fluid composition of claim 18, wherein the particles comprise a weighting agent.

24. The fluid composition of claim 18, wherein an amount of the cystosol ester compound present in the fluid composition is in a range of from about 0.05% to about 5% by total weight of the fluid composition.

25. The fluid composition of claim 18, wherein an amount of the cystosol ester compound present in the fluid composition is in a range of from about 0.1% to about 4% by total weight of the fluid composition.

26. The fluid composition of claim 18, wherein an amount of the cystosol ester compound present in the fluid composition is in a range of from about 0.2% to about 3% by total weight of the fluid composition.

27. The fluid composition of claim 18, further comprising organophilic clay.

28. A fluid composition comprising:
a non-aqueous fluid, particles, and a cystosol ester for reducing sag in the fluid composition, wherein the non-aqueous fluid comprises an invert-emulsion and the particles comprise barite wherein the cystosol ester compound is represented by the following formula:

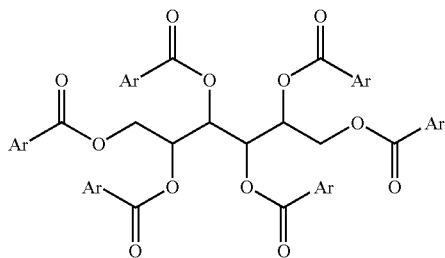

I.

wherein Ar is represented by the following formula:

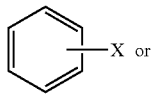

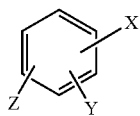

II.

wherein in formula I, X=hydrogen, an alkyl group, an alkoxyl group, a nitro group, a halide group, a cyano group, an amino group, or an aryl group, and wherein in formula II, X=Y=Z an alkoxy or an alkyl group; X=Y or Z with X, Y and Z being selected from the group consisting of hydrogen, an alkyl group, an alkoxyl group, a nitro group, a halide group, a cyano group, an amino group, and an aryl group; X=Y≠Z with X, Y, and Z being selected from the group consisting of hydrogen, an alkyl group, an alkoxyl group, a nitro group, a halide group, a cyano group, an amino group, and an aryl group; or X≠Y≠Z with X, Y, and Z being selected from the group consisting of hydrogen, an alkyl group, an alkoxy group, a nitro group, a halide group, a cyano group, an amino group, and aryl group.

29. The fluid composition of claim 28, wherein the sag is reduced by from about 5% to about 100%.

30. The fluid composition of claim 28, wherein the sag is reduced by from about 10% to about 100%.

31. The fluid composition of claim 28, wherein the sag is reduced by from about 15% to about 100%.

* * * * *